Jan. 7, 1947.        W. DENNIS         2,413,752
SEPARATION OF THE CONSTITUENTS OF GASEOUS MIXTURES
Filed July 28, 1944        2 Sheets-Sheet 1

INVENTOR
Wolcott Dennis
BY
ATTORNEYS

Patented Jan. 7, 1947

2,413,752

UNITED STATES PATENT OFFICE 2,413,752

SEPARATION OF THE CONSTITUENTS OF GASEOUS MIXTURES

Wolcott Dennis, Darien, Conn., assignor to Air Reduction Company, Incorporated, New York, N. Y., a corporation of New York Application July 28, 1944, Serial No. 547,048

8 Claims. (Cl. 62—175.5)

1

This invention relates to the separation of the constituents of gaseous mixtures by liquefaction and rectification and particularly to the removal of impurities present in the gaseous mixture without resort to chemical treatment. While intended primarily for use in the treatment of air, it may be utilized in the recovery of the constituents of other gaseous mixtures.

One of the problems in the recovery of oxygen, nitrogen, etc., from the atmosphere results from the presence of carbon dioxide in the air treated. Since carbon dioxide congeals at the low temperatures employed, it interferes with the operation unless removed. It is customary to subject the air to treatment in large caustic towers to remove the carbon dioxide. This introduces considerable expense and other difficulties. Oil and hydrocarbon derivatives are introduced in the compressors employed to raise the pressure of the air, and since such compounds are not readily removable from the air, they accumulate in the system and find their way into the products.

It is the object of the present invention to provide a simple, economical and effective method of removing impurities from gaseous mixtures and particularly to ensure the elimination of impurities such as carbon dioxide in a liquefaction method employing successive expansion of air with external work to produce refrigeration.

Another object of the invention is the provision of a method of producing liquid oxygen free from impurities and in an efficient manner.

Figure 1:
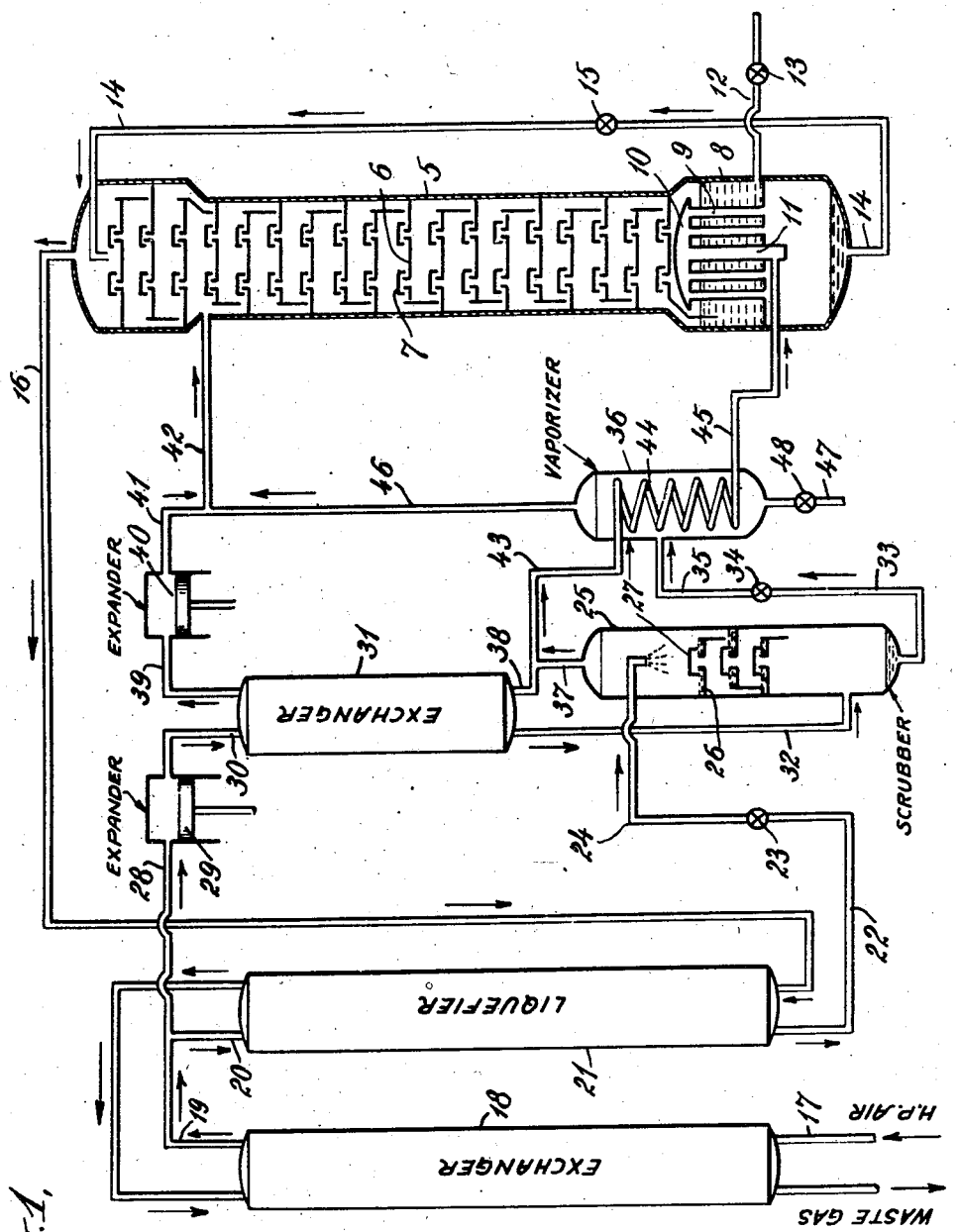
Figure 2:
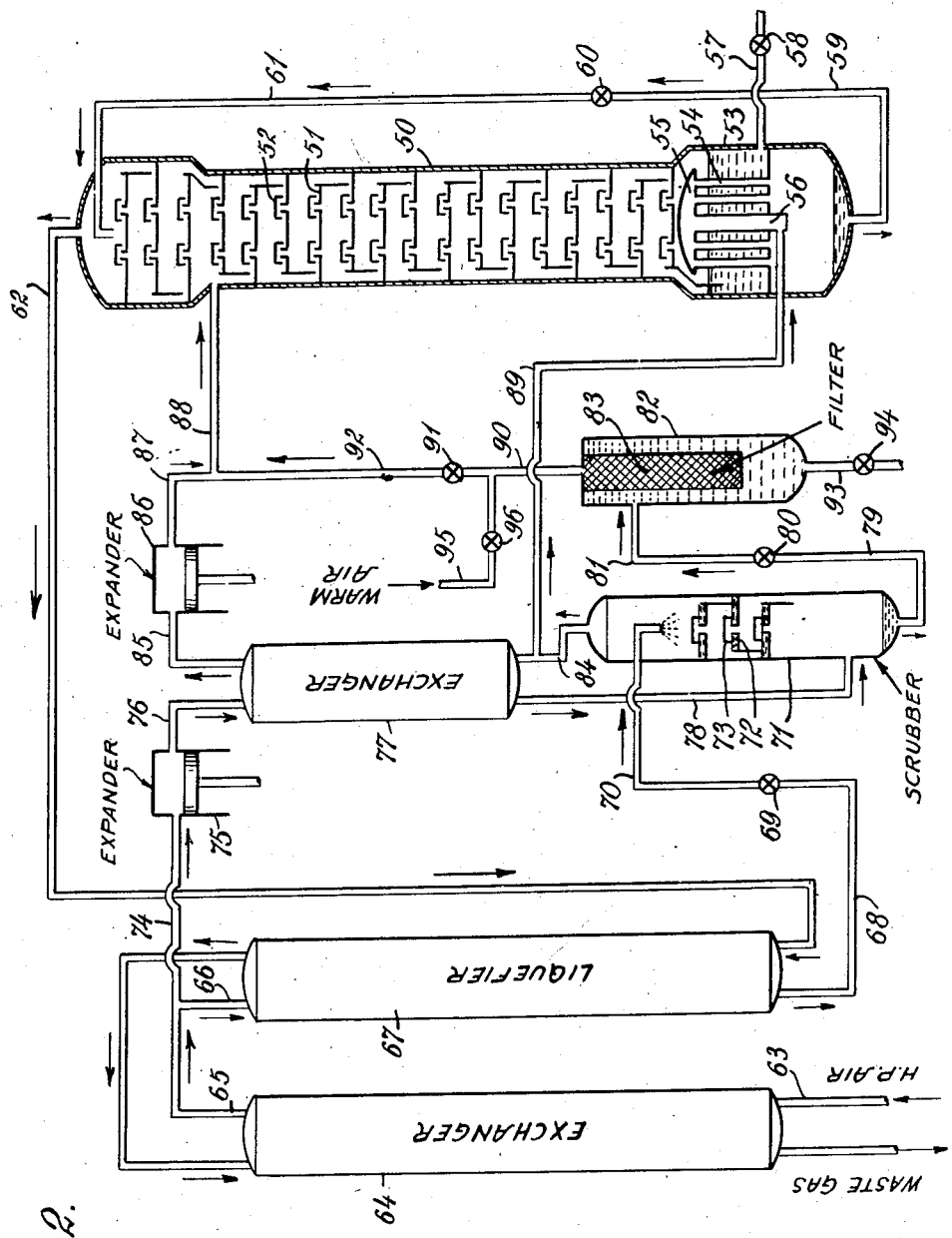

Other objects and advantages of the invention will be apparent as it is better understood by reference to the following specification and the accompanying drawings, in which Fig. 1 is a diagrammatic illustration of an apparatus suitable for the practice of the invention; and Fig. 2 is a similar view illustrating a modified form of the apparatus.

When a single column is used to produce a liquid oxygen product the air pressure required to produce the necessary refrigeration may be materially reduced by employing a second expansion engine or turbine expanding a portion of the first or high pressure engine exhaust to a lower pressure and exhausting this portion into the column rectifier. In this way efficient production of liquid oxygen may be carried out at initial air pressure of about 40 atmospheres.

The use of filters for carbon dioxide removal in such a method leads to complications in the operation of the plant and to pressure drops which interfere with efficient expansion of the air to

2 produce refrigeration and the application of a scrubber to the first expansion engine exhaust results in a saturated vapor which cannot be expanded efficiently in the second engine due to formation of liquid within the engine during expansion. In order to produce the maximum expansion work and hence the most refrigerative effect, it is desirable to admit air to the second engine at the highest practicable temperature and to avoid excessive pressure drops.

I have discovered that solidified particles of carbon dioxide, residual moisture, oil and other hydrocarbons may be separated readily from a gaseous mixture such as air entering a liquefaction system by the procedure hereinafter described, and that the operation may be conducted with great efficiency. In carrying out the invention, the air is initially compressed to a relatively high pressure and portions thereof are expanded consecutively with external work. The air is subjected between expansions to the scrubbing action of liquid produced from a portion of the air to concentrate solidified impurities therein and the liquid containing the impurities is either vaporized or filtered so that the impurities are separated. The air which is delivered to the rectifier is free from impurities and consequently none of them can accumulate in the liquid oxygen product.

The drawings illustrate two procedures by which the solidified carbon dioxide and other impurities are removed in such a liquefaction cycle without interfering materially with the thermodynamic efficiency of the method. Both of these procedures employ a scrubber in which the exhaust air of the first or high level expansion is purified by contacting with the liquefied portion of the high pressure air after throttling to a lower pressure. A portion of the scrubbed air is warmed up by exchange of heat between the high level engine exhaust and itself and then passes to the second or low level expansion engine and then after the second expansion to the column low pressure rectifier. Sufficient superheat is obtained in the inlet gas to the low level expander to insure efficient expansion at this point.

The drawings illustrate two procedures for purification of the impure liquid reaching the bottom of the scrubber in which the impurities of the original air are accumulated. In one case the impure liquid is filtered before admission to the rectification column and means are provided for draining the impurities from the filter from time to time and backwashing the filter cloth when necessary. In the other case the impure liquid is admitted to a small vaporizer at reduced pressure and is vaporized by heat exchange with condensing purified vapor from the scrubber outlet. The vapor produced from the impure liquid is admitted to the low pressure rectifier together with the exhaust of the second engine. From time to time as required the impurities accumulating in the vaporizer are purged.

Referring to the drawings, 5 indicates a column provided with the usual trays 6 and bubble caps 7. At the bottom of the column, a vaporizer section 8 is provided with tubes 9 terminating in a header 10 to which air is fed through a pipe 11. The air is liquefied in the tubes by heat exchange with liquid oxygen accumulating in the vaporizer section 8 from which the liquid oxygen may be withdrawn through a pipe 12 controlled by a valve 13. The liquid air is withdrawn through a pipe 14 and delivered through an expansion valve 15 to the top of the column 5. As it flows downwardly over the trays 6, the liquid is progressively enriched in oxygen. Vapor rich in nitrogen is withdrawn through the pipe 16.

The air to be separated is initially compressed in suitable apparatus (not shown) to a relatively high pressure, for example about 40 atmospheres, and after initial cooling is introduced through a pipe 17 to an exchanger 18 where it is further cooled by heat exchange with the nitrogen effluent from the column 5. The air is withdrawn through a pipe 19 and a portion thereof diverted through a pipe 20 to a liquefier 21 where the air is further cooled and liquefied by heat exchange with the nitrogen effluent. The liquid from the liquefier 21 is delivered by a pipe 22 through an expansion valve 23 whereby the pressure is reduced to approximately 5 atmospheres. The liquid flows through a pipe 24 to a scrubber 25 having trays 26 and bubble caps 27.

The remainder of the air is delivered through a pipe 28 to an expansion engine 29 where it is expanded with external work to a suitable pressure for example about 5 atmospheres. From the engine, the expanded air passes through a pipe 30 to an exchanger 31 wherein it is further cooled by heat exchange with air from the scrubber 25. Leaving the exchanger 31, the air is delivered by a pipe 32 to the bottom of the scrubber 25 and passes upwardly through the trays 26 in contact with the liquid air supplied through the pipe 24. Impurities in the gaseous phase air accumulate in the liquid which is withdrawn through a pipe 33. The liquid passes through an expansion valve 34 whereby the pressure is reduced to approximately 1 atmosphere, at which pressure the liquid is delivered through a pipe 35 to a vaporizer 36.

The vapor phase air escaping from the scrubber 25 through a pipe 37 is separated into two parts, one of which is delivered by a pipe 38 to the exchanger 31 wherein it is warmed by heat exchange with expanded air from the engine 29. The vapor phase air is withdrawn through a pipe 39 and delivered to an expansion engine 40 where it is expanded with external work to a pressure of approximately 1 atmosphere. From the engine 40 the low pressure air is delivered through pipes 41 and 42 to the upper level of the column 5.

The remainder of the vapor phase air is delivered through a pipe 43 to a coil 44 in the vaporizer 36. It is further cooled in vaporizing liquid in the vaporizer 36 and is delivered through a pipe 45 to the pipe 11 at the bottom of the column 5. The vapor from the vaporizer 36 escapes through a pipe 46 and joins the expanded air entering the column through the pipe 42. Impurities accumulate in the liquid which remains unvaporized in the vaporizer 36 and may be withdrawn from time to time through a purge 47 controlled by a valve 48.

It will be noted that all of the air entering the column 5 through the pipes 42 and 45 has been purified initially by scrubbing and subsequently by vaporization of the liquid formed in the liquefier 21. Impurities which solidify at the temperature involved are retained in the vaporizer 36, and by purging liquid from the vaporizer at intervals, such impurities can be withdrawn from the system. The impurities do not enter the column 5 and consequently the liquid oxygen accumulating in the vaporizer 8 is free from such impurities. By expanding the air successively with external work, it is possible to maintain the necessary refrigeration to permit operation in the manner described and to maintain efficient and economical application of the principles involved.

Referring to Fig. 2, a column 50 is provided with the usual trays 51 and bubble caps 52. A vaporizer 53 at the bottom of the column is provided with tubes 54 and a header 55 connected to a pipe 56. Air introduced through the pipe 56 is liquefied by heat exchange with liquid oxygen accumulating in the vaporizer 53 from which it may be withdrawn through a pipe 57 controlled by a valve 58. Liquid air produced in the tubes 54 is withdrawn through a pipe 59 and expansion valve 60 and is delivered by a pipe 61 to the top of the column 50. It flows downwardly over the trays 51, becoming enriched in oxygen. An effluent consisting principally of nitrogen is withdrawn through a pipe 62.

The air to be separated, initially compressed to a relatively high pressure for example 40 atmospheres, is introduced through a pipe 63 to an exchanger 64 where it is cooled by heat exchange with the effluent nitrogen. It is withdrawn through a pipe 65, and a portion is diverted by pipe 66 to a liquefier 67 where the air is further cooled and liquefied by heat exchange with the effluent nitrogen. The liquid is delivered by a pipe 68 to an expansion valve 69 whereby the pressure is reduced, for example to about 5 atmospheres, at which pressure the liquid is delivered by a pipe 70 to a scrubber 71 having trays 72 and bubble caps 73.

The remainder of the air is delivered through a pipe 74 to an expansion engine 75 where it is expanded with external work to a suitable pressure, for example about 5 atmospheres. Thence the air travels through a pipe 76 to an exchanger 77 where it is further cooled by heat exchange with vapors from the scrubber 71. The air is delivered through a pipe 78 to the bottom of the scrubber 71 and passes upwardly through the trays 72 in contact with a liquid. Impurities present in the air are thus transferred to the liquid in which they accumulate. The liquid containing the impurities is delivered through a pipe 79 and expansion valve 80 to a pipe 81 which is connected to a filter 82 including a filter element 83 of any suitable material which will prevent passage of solid particles of carbon dioxide and the like while permitting the liquid to escape.

The vapor phase air from the scrubber 71 is withdrawn through a pipe 84 and a portion thereof is delivered to the exchanger 77 for heat exchange with the air from the expansion engine 75. The vapor phase air is withdrawn through a pipe 85 and delivered to an expansion engine 86 where it is expanded with external work to a suitable pressure, for example about 1 atmosphere. Thence it is delivered through pipes 87 and 88 to an upper level of the column 50. The balance of the vapor phase air from the scrubber 71 is delivered through a pipe 89 to the pipe 56 to provide liquid in the column 50.

The liquid air, free from solid impurities, which passes the filter element 83 is delivered through a pipe 90 and expansion valve 91 to a pipe 92 which is connected to the pipe 88. The liquid enters the column with the air expanded in the expansion engine 86.

In order to free the filter 82, and the filter element 83, from accumulated impurities, a purge 93 provided with a valve 94 permits escape of liquid when the valve 94 is opened. During purging, the valves 80 and 91 may be closed, and air or other gas under pressure may be introduced through a pipe 95 controlled by a valve 96 which is closed in normal operation. The gas under pressure forces any particles from the surface of the filter element 83 so that they are discharged with the liquid.

To avoid shut-down of the entire operation, the scrubber 71 may be of sufficient size to accumulate a surplus of liquid. After purging, the valves 80 and 91 may be re-opened and the accumulated liquid discharged into the filter, thus permitting immediate resumption of normal operation. As in the preceding embodiment of the invention, the procedure utilizes successive expansion of the air with external work. All of the air entering the column 50 is previously freed from impurities such as carbon dioxide. Hence none of these impurities can accumulate in the liquid oxygen which is withdrawn through the pipe 57.

The procedures as described afford numerous advantages, particularly in the production of high purity oxygen liquid, and especially in plants designed to produce large quantities of such liquid. A double column may be employed in this process if the air pressure is sufficiently increased to match the amount of liquid produced with the ability of the column to rectify the air. However, at 40 atmospheres air pressure and with efficient expansion engines a single column is sufficient to rectify the liquid product and a double column is unnecessary.

Various changes may be made in the form and arrangement of the apparatus employed without departing from the invention or sacrificing the advantages thereof.

I claim:

1. The method of separating the constituents of gaseous mixtures by liquefaction and rectification which comprises compressing and cooling the gaseous mixture liquefying a portion of the compressed and cooled gaseous mixture by heat exchange with a separated constituent, expanding the remaining portion of the gaseous mixture with external work, scrubbing the expanded portion with the liquefied portion to remove impurities therefrom, expanding some of the scrubbed gaseous mixture with external work, liquefying the remainder of the scrubbed gaseous mixture rectifying the expanded, scrubbed gaseous mixture by contact with the liquefied remainder of the scrubbed gaseous mixture, and purging liquid in which impurities have accumulated.

2. The method of separating the constituents of gaseous mixtures by liquefaction and rectification which comprises compressing and cooling the gaseous mixture liquefying a portion of the compressed and cooled gaseous mixture by heat exchange with a separated constituent, expanding the remaining portion of the gaseous mixture with external work, scrubbing the expanded portion with the liquefied portion to remove impurities therefrom, expanding some of the scrubbed gaseous mixture with external work liquefying the remainder of the scrubbed gaseous mixture and rectifying the expanded, scrubbed gaseous mixture by contact with the liquefied remainder of the scrubbed gaseous mixture, separating from the liquid containing impurities a fraction free from such impurities, delivering it to the rectification, and purging liquid in which impurities have accumulated.

3. The method of separating the constituents of gaseous mixtures by liquefaction and rectification which comprises compressing and cooling the gaseous mixture liquefying a portion of the compressed and cooled gaseous mixture by heat exchange with a separated constituent, expanding the remaining portion of the gaseous mixture with external work, scrubbing the expanded portion with the liquefied portion to remove impurities therefrom, expanding some of the scrubbed gaseous mixture with external work liquefying the remainder of the scrubbed gaseous mixture and rectifying the expanded, scrubbed gaseous mixture by contact with the liquefied remainder of the scrubbed gaseous mixture, separating from the liquid containing impurities a liquid fraction free from such impurities, delivering it to the rectification, and purging liquid in which impurities have accumulated.

4. The method of separating the constituents of air by liquefaction and rectification which comprises compressing and cooling the air, liquefying a portion of the compressed and cooled air by heat exchange with a separated constituent, expanding the remaining portion of the air with external work, scrubbing the expanded portion with the liquefied portion to remove impurities therefrom, expanding some of the scrubbed air with external work liquefying the remainder of the scrubbed air and rectifying the expanded, scrubbed air by contact with the liquefied remainder of the scrubbed air and purging liquid air in which impurities have accumulated.

5. The method of separating the constituents of air by liquefaction and rectification which comprises compressing and cooling the air, liquefying a portion of the compressed and cooled air by heat exchange with a separated constituent, expanding the remaining portion of the air with external work, scrubbing the expanded portion with the liquefied portion to remove impurities therefrom, expanding some of the scrubbed air with external work liquefying the remainder of the scrubbed air and rectifying the expanded, scrubbed air by contact with the liquefied remainder of the scrubbed air, separating from the liquid air containing impurities a fraction free from such impurities, delivering it to the rectification and purging liquid air in which impurities have accumulated.

6. The method of separating the constituents of air by liquefaction and rectification which comprises compressing and cooling the air, liquefying a portion of the compressed and cooled air by heat exchange with a separated constituent, expanding the remaining portion of the air with external work, scrubbing the expanded portion with the liquefied portion to remove impurities therefrom, expanding some of the scrubbed air with external work liquefying the remainder of the scrubbed air and rectifying the expanded, scrubbed air by contact with the liquefied remainder of the scrubbed air, separating from the liquid air containing impurities a liquid fraction free from such impurities, delivering it to the rectification and purging liquid air in which impurities have accumulated.

7. The method of separating the constituents of gaseous mixtures by liquefaction and rectification which comprises compressing and cooling the gaseous mixture, liquefying a portion of the compressed and cooled gaseous mixture by heat exchange with gaseous products of the separation, expanding the remaining portion with external work, scrubbing the expanded portion with the liquefied portion to concentrate impurities in the liquid fraction, separating and withdrawing the impurities, subjecting a fraction of the scrubbed vapor to heat exchange with the unscrubbed expanded gas, expanding the scrubbed and heated fraction to the rectification pressure liquefying the remainder of the scrubbed gaseous mixture and rectifying the expanded, scrubbed gaseous mixture by contact with the liquefied remainder of the scrubbed gaseous mixture.

8. The method of separating the constituents of gaseous mixtures by liquefaction and rectification which comprises compressing and cooling the gaseous mixture, liquefying a portion of the compressed and cooled gaseous mixture by heat exchange with gaseous products of the separation, expanding the remaining portion with external work, scrubbing the expanded portion with the liquefied portion to concentrate impurities in the liquid portion, vaporizing most of the resulting impure liquid by heat exchange with part of the scrubbed vapor and withdrawing the remainder of the impure liquid together with the impurities, heating the remainder of the scrubbed vapor by exchange with unscrubbed gas from the first expansion, expanding this scrubbed and heated remainder and subjecting it and the vapor produced from the impure liquid to rectification.

WOLCOTT DENNIS.